United States Patent [19]

Baehre

[11] Patent Number: 5,232,323

[45] Date of Patent: Aug. 3, 1993

[54] REMOVABLE THREADED FASTENER WITH LOCKING PLATE

[75] Inventor: Eric E. Baehre, West Chester, Ohio

[73] Assignee: General Electric Company, Cincinnati, Ohio

[21] Appl. No.: 952,396

[22] Filed: Sep. 28, 1992

[51] Int. Cl.⁵ .................. F16B 37/04; F16B 37/12; F16B 39/02

[52] U.S. Cl. .................. 411/178; 411/109; 411/183; 411/271; 411/937.2

[58] Field of Search .............. 411/16, 17, 166, 178, 411/180, 181, 968, 109, 183, 271, 937.2

[56] References Cited

U.S. PATENT DOCUMENTS

| | | | |
|---|---|---|---|
| 3,215,183 | 11/1965 | Dietlein | 411/109 |
| 3,259,161 | 7/1966 | Rosan . | |
| 3,259,162 | 7/1966 | Rosan . | |
| 3,391,721 | 7/1968 | Rosan . | |
| 3,395,934 | 8/1968 | Rosan | 285/23 |
| 3,405,591 | 10/1968 | Neuschotz | 411/178 X |
| 3,630,252 | 12/1971 | Rosan, Sr. . | |
| 3,702,707 | 11/1972 | Rosan, Sr. | 285/23 |
| 3,720,969 | 3/1973 | Rosan, Sr. | 10/27 |
| 4,093,011 | 6/1978 | Bucknavich . | |
| 4,236,495 | 12/1980 | Rosan, Jr. | 123/188 |
| 4,562,755 | 1/1986 | Reece | 81/53 |
| 4,568,228 | 2/1986 | Rosan, Jr. | 411/178 |
| 4,572,718 | 2/1986 | Stevens et al. | 411/180 X |
| 4,780,036 | 10/1988 | Mao et al. | 411/194 |
| 4,828,441 | 5/1989 | Frasca | 411/183 |
| 5,040,277 | 8/1991 | Dessouky | 29/240 |

OTHER PUBLICATIONS

Rosan, Inc., "High Performance Fasteners And Adapters For Turbo-Machinery", a Rexnord Co., Rosan, Inc. Catalog, pp. 1-33.

Primary Examiner—Neil R. Wilson
Attorney, Agent, or Firm—Jerome C. Squillaro

[57] ABSTRACT

The present invention provides a threaded insert assembly with a locking plate having a non-circular shape and a non-serrated outer edge instead of a conventional circular shaped locking ring having a circular serrated outer edge. The non-circular locking plate is shaped to engage mating edges of a correspondingly shaped recess formed in the anchoring structure so as prevent the insert from rotating out of the anchoring structure once the insert is locked into the plate. The threaded insert is secured to the locking plate by interdigitated serrations swaged into engagement.

13 Claims, 3 Drawing Sheets

REMOVABLE THREADED FASTENER WITH LOCKING PLATE

BACKGROUND OF THE INVENTION

1. Field of the Invention

This invention relates to fastening assemblies such as threaded inserts with anti-rotational locking devices used to receive threaded fasteners, more particularly, it relates to such assemblies having a non-circular anti-rotation locking plate used to secure the threaded insert.

2. Description of Related Art

The present invention relates to fasteners in general and more particularly to anchoring fasteners with lock rings that are preferably removably threaded in an anchoring structure and which typically cooperates with another fastener to hold other structures to the anchoring structure. Unscrewing of the threaded anchoring fastener is typically prevented by a circular locking ring having serrations around its periphery which is swaged into a suitably adapted recess in the anchoring structure. The threads of the insert and stud can be of hardened material, much harder than the anchoring structure. Examples of threaded anchoring fasteners are threaded inserts and studs.

Inserts installed in a workpiece provide a means of attachment of an object to the anchoring structure. Inserts are used when the stress requirements are greater than are provided by the anchoring structure. An insert can distribute the stress over a much greater area and can be harder material than would be provided by the anchoring structure alone. Inserts are also used to provide positive locking of the anchoring fastener in the anchoring structure by means of a locking device or feature contained within the insert. An example of an insert is a plug-like object having external threads to bit into or cooperate with the anchoring structure material. The insert also has internal threads for receiving the male threads of a cooperating piece.

Studs in contrast provide an anchor for attachment of objects to a anchoring structure. A stud secures to a anchoring structure with male threads and itself provides male threads for cooperation with a female threaded nut or other fastening means.

Threaded inserts of the type formed of a relatively hard material such an INCONEL 718 and adapted to be anchored in an anchoring structure of softer material such as aluminum have been widely used in such applications as gas turbine engine structures and similar structures. These threaded inserts typically are adapted to be threaded into a bore in the anchoring structure and then locked into position by means of a generally circular serrated locking ring which is adapted to mate with the threaded insert and to be forced into the surrounding anchoring structure such as by swaging. This causes cold flow of the anchoring structure material so as to secure the locking ring and thereby the insert against rotation in the anchoring structure. The serrations provide a means for allowing the forcing of the locking ring into the surrounding anchoring structure material by cold flow and also allow for relatively great torsional strength between the locking ring and the threaded insert. The cold flow of the anchoring structure material firmly secures the locking ring in position to prevent if rom becoming dislodged.

A major disadvantage of the serrated locking ring is that the serrations can result in unacceptable stress risers in he parent material and may become failure initiation sites and initiate failure in the anchoring structure if the parent material is highly loaded. Often the advantages of threaded inserts cannot be realized because the stress risers caused by the serrated locking ring is unacceptable. Furthermore, designs which propose to use keys or serrations that are preferentially oriented out of the primary stress field may result in failures if they are inadvertently installed in the wrong orientation or if the direction of the stress field changes.

Another drawback to these arrangements exists in that no practical, easily implemented technique is possible for removing an insert so as to allow replacement without damaging the surrounding material of the anchoring structure. The serrations of the locking ring on the new insert may not be firmly secured due to the presence of the old impressions left by the old locking ring of the original insert. Thus, drilling out of the old bore and replacement with a larger size insert would be necessary.

Therefore, the object of the present invention is to provide such an anti-rotational locking ring and threaded insert assembly which lowers stress risers caused by serrated edge locking rings and is easily removable thereby providing for easily replaceable threaded inserts.

SUMMARY OF THE INVENTION

The present invention provides a threaded insert assembly with a locking plate having a non-circular planform shape and a non-serrated outer edge instead of a conventional circular shaped locking ring having a circular serrated outer edge. The non-circular locking plate is shaped such that it will engage mating edges of a correspondingly shaped recess formed in the anchoring structure so as to not allow the insert to rotate out of the anchoring structure once the insert is locked into the plate. The threaded insert is locked to the locking plate by serrations or locking keys. The preferred embodiment provides an upper portion of the insert having external serrations that can be swaged into the inner diameter of a center aperture in the locking plate. The swaging drives the outer serrations of the insert into locking engagement with inner serrations on the inner diameter of the center aperture of the locking plate.

One embodiment provides the locking plate with a non-circular planform shape to minimize a stress riser created by installing it into the anchoring structure. Shaping the locking plate so as to avoid sharp corners, notches or edges in any direction helps reduce stress in the anchoring structure. Among the shapes contemplated by the present invention are square, rectangular, triangular, elliptical, and the preferred racetrack shape. Another embodiment provides a means to press fit the plate into the anchoring structure after the insert is threaded in.

ADVANTAGES

The present invention provides a threaded insert assembly which lowers stresses in and increases the life of the anchoring structure into which the insert is installed by locking the insert to the plate and using the plate to anti-rotationally lock the insert into the anchoring structure. Any stress risers associated with a conventional locking ring having keys or serrations are located in the lowly loaded locking plate rather than in the highly loaded anchoring structure.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
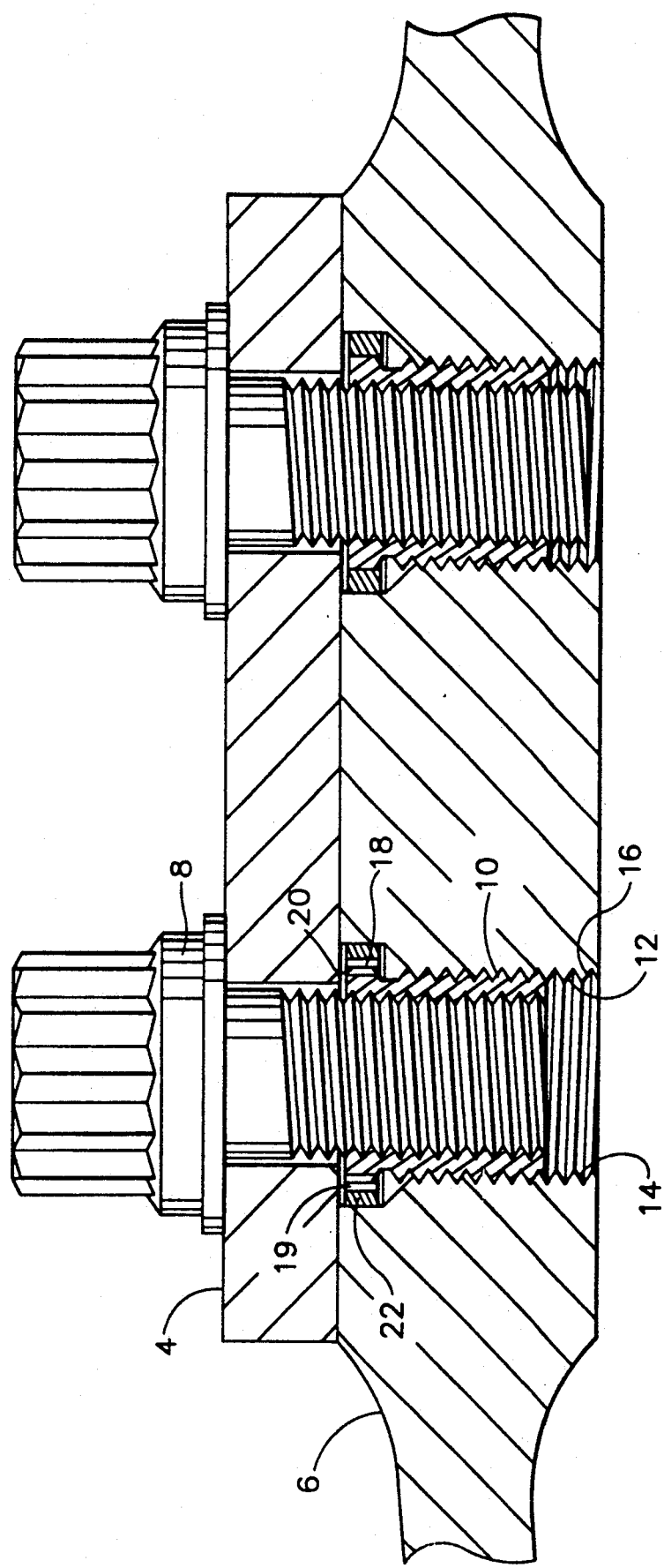
FIG. 1 is a sideways cross-sectional view of a threaded insert assembly having an anti-rotational locking plate inserted in an anchoring structure in accordance with the present invention.

Illustrated in FIG. 1 is an element 4 mounted to an anchoring structure 6 by a fastener in the form of a threaded screw 8. The threaded screw 8 is threaded into insert internal threads 12 of the threaded insert 10 and the externally threaded insert 10 is threaded into threaded bore 14 in the anchoring structure 6 by insert external threads 16. The threaded insert 10 includes an upper portion 11 that has external serrations 18 disposed about its outer diameter OD above the insert external threads 16. Surrounding the external serrations 18 is a non-circular shallow recess 28 disposed in the anchoring structure 6 and shaped to receive an anti-rotational locking plate 22.

Figure 2:
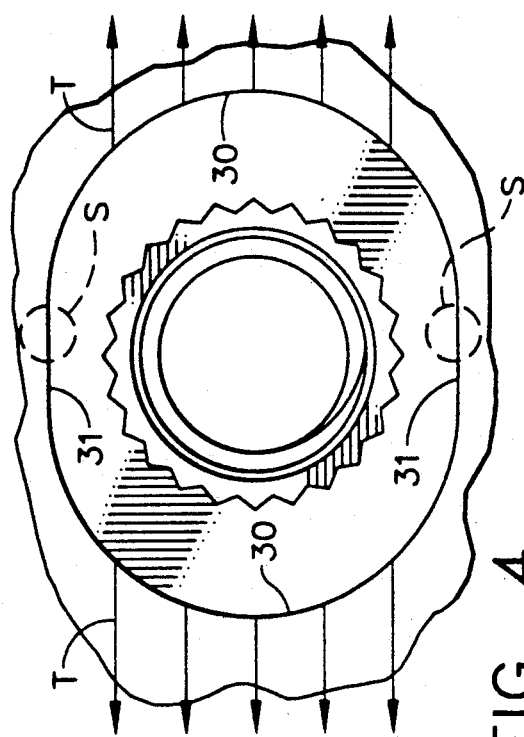
FIG. 2 is a top view of a threaded insert and anti-rotational locking plate assembly inserted in an anchoring structure in accordance with the present invention.

Referring to FIG. 2, the locking plate 22 has internal serrations 20 about an inner diameter ID of a center aperture 19 which provides a anti-rotational locking means to lock the locking plate 22 to the threaded insert 10. The external serrations 18 are designed to be aligned with the internal serrations 20 and then together with the upper portion 11 swaged onto and anti-rotationally secured to the locking plate 22. Equivalent means of securing the locking plate 22 to the threaded inset 10 are contemplated by the present invention including having mating keys instead of serrations or serrations on just one of th either the ID or OD of the locking plate or threaded insert 10 respectively.

The preferred embodiment illustrated in FIG. 2 provides that the inner diameter ID of the locking plate 22 is sufficiently larger than the outer diameter OD of the threaded insert 10 such that the external serrations 18 and the internal serrations 20 do not interfere with each other as the threaded insert 10 is threaded into the bore 14 after the locking plate has been placed in the recess 28. The serrations of either the locking plate or the insert may then be aligned so as to be disposed between the serrations of the other element by threading the insert in or out of the bore 14. Alternatively the inner diameter ID of the locking plate 22 may be smaller than the outer diameter OD of the threaded insert 10 and the threaded insert must be threaded into the bore before the locking plate is placed into the recess 28. Alignment in either case may be done by threading the threaded insert 10 into or out of the threaded bore 14 just a bit so that the serrations align. This alternative embodiment provides an additional feature and benefit that the swaging operation is not required to secure the insert to the locking plate to prevent rotation therebetween.

Figure 4:
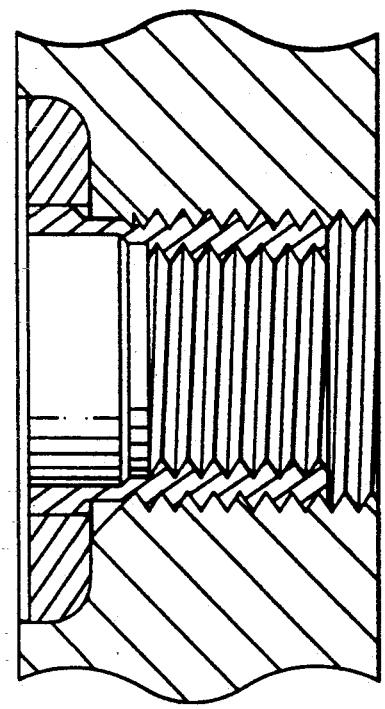
FIG. 4 is a top view of the threaded insert anti-rotationally secured to the locking plate in FIG. 3.
Figure 3:
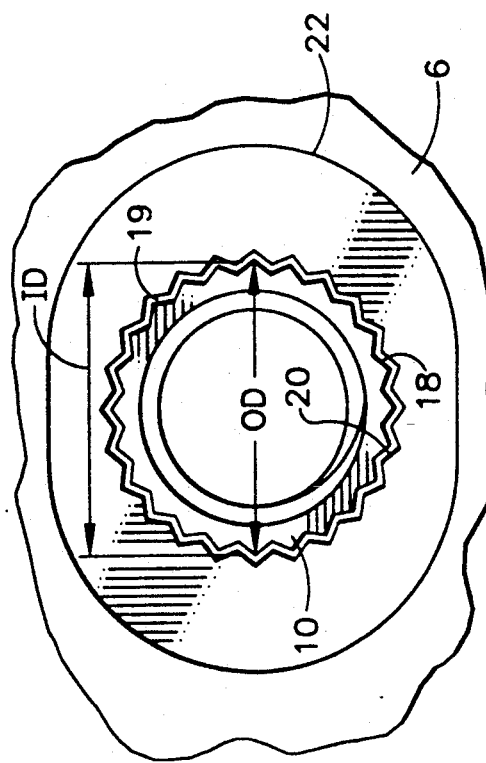
FIG. 3 is a cross-sectional of the assembly illustrated in FIG. 2.
Figure 5:
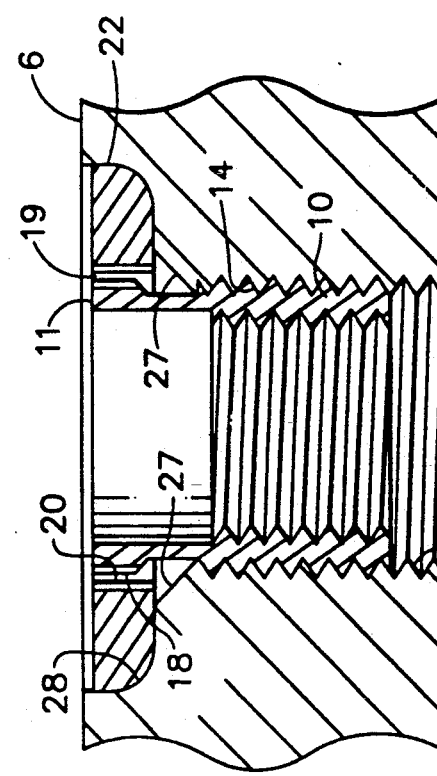
FIG. 5 is a cross-sectional of the assembly illustrated in FIG. 4.

FIGS. 4 and 5 illustrate the mated serrations after the upper portion 11 of the threaded insert 10 has been swaged outward forcing its external serrations 18 between and in locking engagement with the internal serrations 20 of the locking plate 22. An annular chamfer 27 is provided at the interface between recess 28 and the threaded bore 14 to provide room for the upper portion 11 to be cold flowed and deformed outward during the swaging operation. Alternatively if no internal serrations 20 are used on locking plate 22 then the external serrations 18 would bite into and secure themselves to the locking plate by a cold flow process.

Figure 6A:
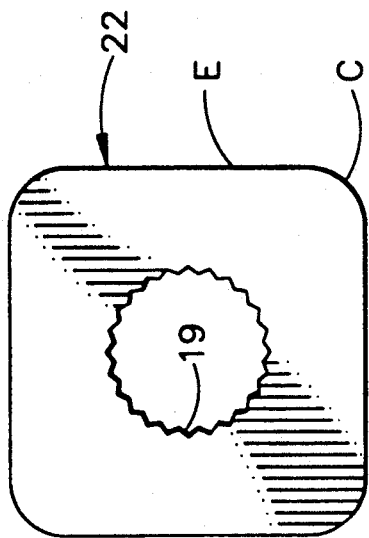
FIG. 6a is a top view of a triangular planiform shaped locking plate in accordance with one alternative embodiment of the present invention.
Figure 6B:
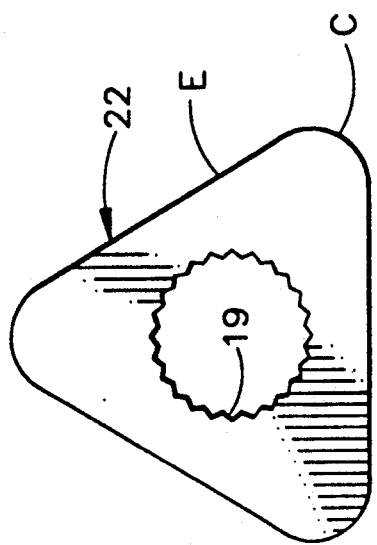
FIG. 6b is a top view of a square planiform shaped locking plate in accordance with yet another alternative embodiment of the present invention.
Figure 6C:
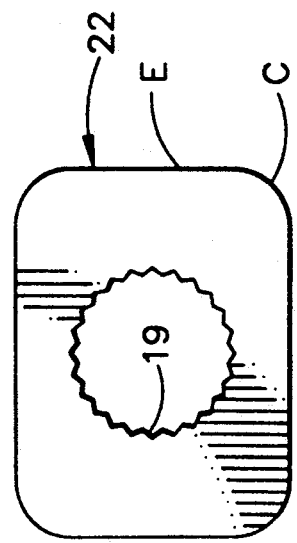
FIG. 6c is a top view of a rectangular planiform shaped locking plate in accordance with yet another alternative embodiment of the present invention.

The shape of the locking plate 22 is illustrated as a racetrack having two semi-circular ends 30 and straight legs 31 therebetween. This type of shape is very economical to produce. An elliptical shape may also be used having its major axis generally aligned parallel to the direction of predetermined tension forces T illustrated in FIG. 4. Such a shape minimizes local maximum stresses which occur at high stress area S. Which ever shape is used the major axis of the planform shape is preferably aligned parallel to the direction of predetermined tension forces T as illustrated in FIG. 4. A major axis defined, for the purpose of this patent, as a line between the distal ends of the planform shape such as the major axis of an ellipse or the centerline between the distal ends of a semi-circular ends of a racetrack shape. FIGS. 6a, 6b, and 6c illustrate other alternative planiform shapes such as triangular, square, and rectangular respectively. In accordance with the present invention the locking plate 22 has outer edges E that are smooth and continuous and have no sharp discontinuities such as serrations or key slots. The edges E also have smoothly curved corners C to avoid stress concentrations.

While the preferred embodiment of the present invention has been described fully in order to explain its principles, it is understood that various modifications or alterations may be made to the preferred embodiment without departing from the scope of the invention as set forth in the appended claims.

We claim:

1. A fastening assembly comprising:
   an externally threaded insert threaded into an internally threaded bore disposed in an anchoring structure,
   a non-circular shaped shallow recess disposed in said anchoring structure about said bore,
   an anti-rotational locking plate having a center aperture that has a common axis with said bore and a non-circular planform shape corresponding to the shape of said non-circular shaped shallow recess,
   said center aperture having an upper portion of said insert disposed therethrough, and
   an anti-rotational locking means for effecting anti-rotational engagement between said anti-rotational locking plate and said insert.

2. A fastening assembly as claimed in claim 1 wherein said anti-rotational locking plate has distal ends defining a major axis therebetween that is parallel to a predetermined direction of tension forces in said anchoring structure in an area around said recess.

3. A fastening assembly as claimed in claim 1 wherein said anti-rotational locking means comprises a plurality of serrations disposed upon one of an inner annular edge of said plate and defining the inner diameter of said center aperture and an annular outer edge of said upper portion defining the outer diameter of said upper portion of said insert and said plurality of serrations being swagable into the other of said inner annular edge and said annular outer edge.

4. A fastening assembly as claimed in claim 3 wherein said non-circular planform shape is triangular.

5. A fastening assembly as claimed in claim 3 wherein said non-circular planform shape is rectangular.

6. A fastening assembly as claimed in claim 3 wherein said non-circular planform shape is square.

7. A fastening assembly as claimed in claim 3 wherein said non-circular planform shape is a racetrack shape having two semi-circular ends and straight legs therebetween.

8. A fastening assembly as claimed in claim 3 wherein said non-circular planform shape is an elliptical shape.

9. A fastening assembly as claimed in claim 3 wherein said insert is a hollow insert having internal threads to accept a correspondingly threaded fastener and said anti-rotational locking means comprises a plurality of internal serrations disposed around the inner diameter of said center aperture and a plurality of external serrations disposed around the outer diameter of said upper portion of said insert.

10. A fastening assembly as claimed in claim 9 wherein said bore includes an annular chamfer disposed coaxially with said bore and between said bore and said recess.

11. A fastening assembly as claimed in claim 1 wherein said anti-rotational locking means comprises:
  a plurality of internal serrations disposed upon an inner annular edge of said plate and defining the inner diameter of said center aperture
  a plurality of external serrations disposed upon an annular outer edge of said upper portion defining the outer diameter of said upper portion of said insert, and
  said plurality of internal serrations being swagable into said plurality of external serrations.

12. A fastening assembly as claimed in claim 11 wherein said inner diameter of said center aperture is larger than said outer diameter of said upper portion of said insert and said internal serrations are interdigitated with said external serrations and said locking plate may be inserted into said recess before said insert is threaded into said anchoring structure.

13. A fastening assembly as claimed in claim 11 wherein said inner diameter of said center aperture is smaller than said outer diameter of said upper portion of said insert and said internal serrations are interdigitated with said external serrations and said locking plate must be press fit into said recess after said insert is threaded into said anchoring structure.

* * * * *